(12) United States Patent
Harmon et al.

(10) Patent No.: US 11,752,891 B2
(45) Date of Patent: Sep. 12, 2023

(54) CHARGING SYSTEM FOR A VEHICLE

(71) Applicant: FORD GLOBAL TECHNOLOGIES, LLC, Dearborn, MI (US)

(72) Inventors: Michael John Harmon, Westland, MI (US); Tithal Bhandari, Streamwood, IL (US); Hussain Z Tajmahal, Detroit, MI (US); Yejin Han, Detroit, MI (US); Ryan Warner, Ann Arbor, MI (US); Rachel Williams, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 17/332,163

(22) Filed: May 27, 2021

(65) Prior Publication Data

US 2022/0379759 A1 Dec. 1, 2022

(51) Int. Cl.
*B60L 53/37* (2019.01)
*B60L 53/16* (2019.01)

(52) U.S. Cl.
CPC .............. *B60L 53/37* (2019.02); *B60L 53/16* (2019.02)

(58) Field of Classification Search
CPC .................................. B60L 53/37; B60L 53/16
USPC ......................................................... 320/107
See application file for complete search history.

(56) References Cited

U.S. PATENT DOCUMENTS

| | | | | |
|---|---|---|---|---|
| 5,401,174 A | * | 3/1995 | Hansen | H01R 13/74 180/65.1 |
| 7,999,506 B1 | | 8/2011 | Hollar et al. | |
| 10,286,793 B2 | * | 5/2019 | Paryani | B60L 53/31 |
| 2009/0121673 A1 | * | 5/2009 | Nakayama | H01R 43/26 901/50 |
| 2017/0334302 A1 | * | 11/2017 | Henderson | B60L 53/18 |
| 2019/0217717 A1 | | 7/2019 | Erb et al. | |
| 2021/0086640 A1 | * | 3/2021 | Cole | B60L 53/16 |
| 2021/0197684 A1 | * | 7/2021 | Graham | B25J 15/0019 |
| 2021/0198093 A1 | * | 7/2021 | Graham | B25J 18/06 |
| 2021/0347274 A1 | * | 11/2021 | Kadoko | F16G 13/16 |
| 2022/0072972 A1 | * | 3/2022 | Yu | B60L 53/60 |
| 2022/0153156 A1 | * | 5/2022 | Goei | B60L 53/665 |

FOREIGN PATENT DOCUMENTS

| | | | | | |
|---|---|---|---|---|---|
| CN | 108631090 A | * | 10/2018 | | B60L 53/16 |
| CN | 112959907 B | * | 3/2022 | | B60L 53/16 |
| DE | 102011114321 A1 | | 3/2013 | | |

(Continued)

*Primary Examiner* — Suresh Memula (74) *Attorney, Agent, or Firm* — David B Kelley; Brooks Kushman P.C.

(57) ABSTRACT

A charging station includes a charging head and a plurality of electrical connectors. The charging head is slidable along a track and rotatable along an axis. The plurality of electrical connectors is secured to the charging head and is disposed radially about the axis. Each of the electrical connectors have a different profile and are configured to engage an electrical port of an electric vehicle having a matching profile to charge the battery of the electric vehicle. The charging head is configured to slide along the track and rotate along the axis to align each of the electrical connectors with a corresponding electrical port. Each of the electrical connectors is configured to advance from and retract to the charging head to engage and disengage the corresponding electrical port.

20 Claims, 4 Drawing Sheets

(56) References Cited

FOREIGN PATENT DOCUMENTS

| DE | 102019100580 A1 | * | 7/2020 | ............. B60L 53/16 |
| DE | 102019107330 A1 | * | 9/2020 | |
| EP | 2555340 A1 | * | 2/2013 | .......... B60L 11/1818 |
| EP | 3512050 A1 | * | 7/2019 | ............. B60L 53/16 |
| EP | 3782847 A1 | * | 2/2021 | ............. B60L 53/16 |
| WO | WO-2012146766 A1 | * | 11/2012 | ............. B60L 53/16 |
| WO | WO-2016077690 A1 | * | 5/2016 | .......... B60L 11/1816 |
| WO | WO-2020239871 A1 | * | 12/2020 | ............. B60L 53/16 |

\* cited by examiner

CHARGING SYSTEM FOR A VEHICLE

TECHNICAL FIELD

The present disclosure relates to hybrid/electric vehicles and charging systems for hybrid/electric vehicles.

BACKGROUND

Hybrid/electric vehicles may be propelled by electric machines that draw power from batteries. In some configurations, the batteries may require charging during non-use.

SUMMARY

A charging station includes a housing, a charging head, a plurality of electrical connectors, and a controller. The housing has a track. The charging head is secured to the track such that the charging head is slidable along the track and rotatable relative to the housing. The plurality of electrical connectors is disposed radially about the charging head. Each of the electrical connectors have a different profile and are configured to advance from and retract to the charging head. The controller is programmed to, in response to parking a vehicle adjacent to the charging station and an electrical port of the vehicle having a profile corresponding to the profile of a first of the plurality of electrical connectors, adjust the position of the charging head along the track to align the charging head with the electrical port, rotate the charging head to align the first of the plurality of electrical connectors to the electrical port, and advance the first of the plurality of electrical connectors from the charging head to connect the first of the plurality of electrical connectors to the electrical port.

A charging station includes a charging head and a plurality of electrical connectors. The charging head is slidable along a track and rotatable along an axis. The plurality of electrical connectors is secured to the charging head and is disposed radially about the axis. Each of the electrical connectors have a different profile and are configured to engage an electrical port of an electric vehicle having a matching profile to charge the battery of the electric vehicle. The charging head is configured to slide along the track and rotate along the axis to align each of the electrical connectors with a corresponding electrical port. Each of the electrical connectors is configured to advance from and retract to the charging head to engage and disengage the corresponding electrical port.

A charging station includes a housing, a charging head, a plurality of electrical connectors, and a controller. The housing has a vertically extending track. The charging head is slidable along the track and rotatable along an axis. The plurality of electrical connectors are disposed radially about the axis. The controller is programmed to, adjust a height of the charging head along the track to correspond to a height of an electrical port of a vehicle, rotate the charging head to align a first of the plurality of electrical connectors to the electrical port, and advance the first of the plurality of electrical connectors from the charging head to connect the first of the plurality of electrical connectors to the electrical port.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
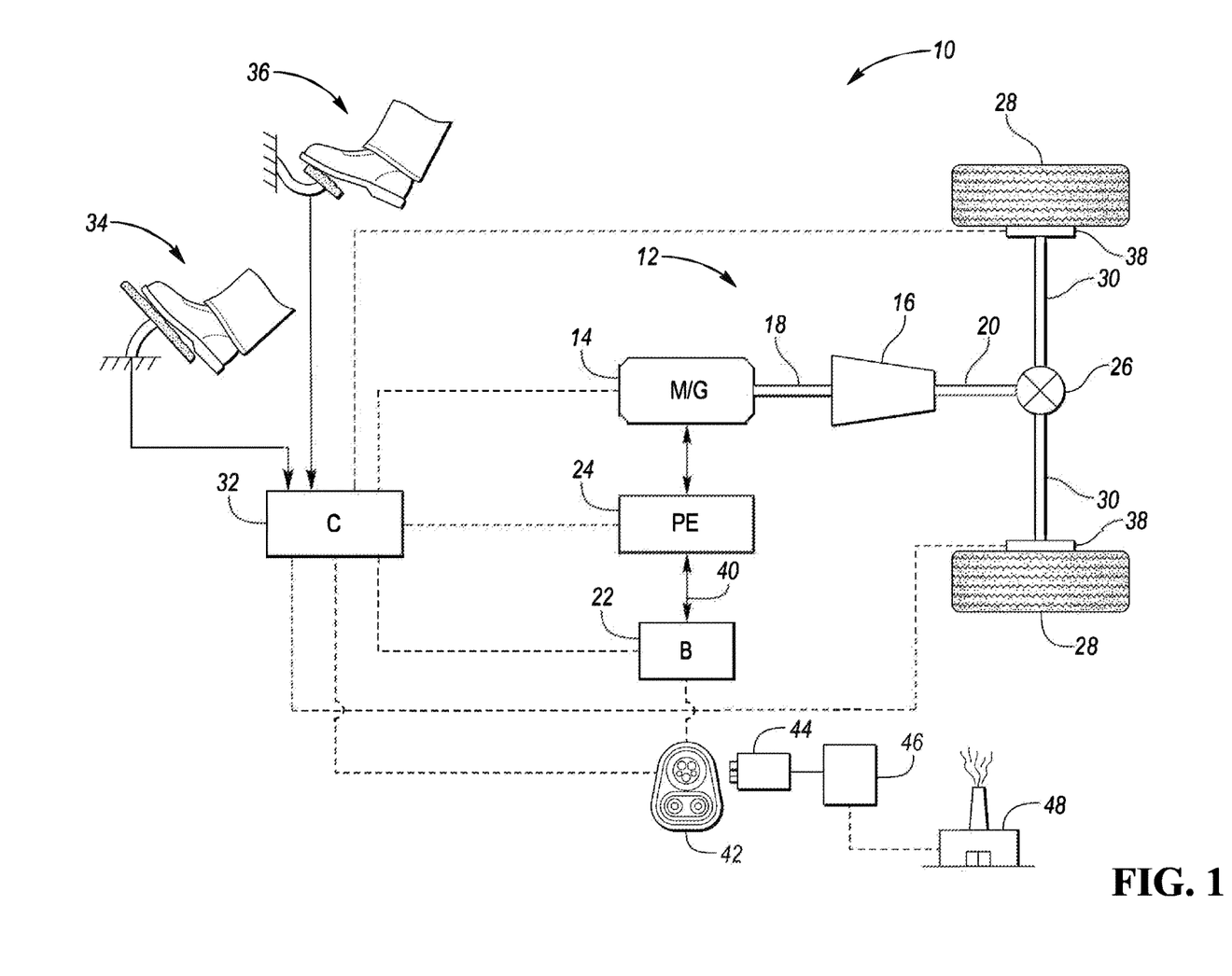
FIG. 1 is a schematic illustration of a representative powertrain of an electric vehicle and a charging system for the electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may be configured to receive power from an external power source to charge the battery 22. For example, the vehicle 10 may include an electrical port 42 that is configured to engage a connector 44 of a charging station 46 to receive power from the charging station 46 to charge the battery 22. The charging station 46 may be connected to a power grid that receives electrical power from a power plant 48.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Referring to FIGS. 2-6, the charging station 46 is further illustrated. The charging station 46 has a housing 50. The housing 50 may be secured to a wall or may be secured to a base 51. The housing 50 may be configured rotate about axis 53 relative to the wall or base 51. An actuator 55, such an electric motor or servo motor, may be configured to rotate the housing relative to the wall or base 51. The housing 50 has a track 52. A charging head 54 is secured to the track 52 such that the charging head 54 is slidable along the track 52 from a first position 56 to a second position 58. A cover 57 may be disposed over an end of the track 42. A storage space 59 may be defined between the cover 57 and the end of the track 42. The cover 57 may be configured to shelter the charging head 54 from the external elements (e.g., snow or rain) when the charging head 54 is in the first position 56 and within the storage space 59. The first position 56 may also be referred to as the stowed position of the charging head 54.

Figure 2:
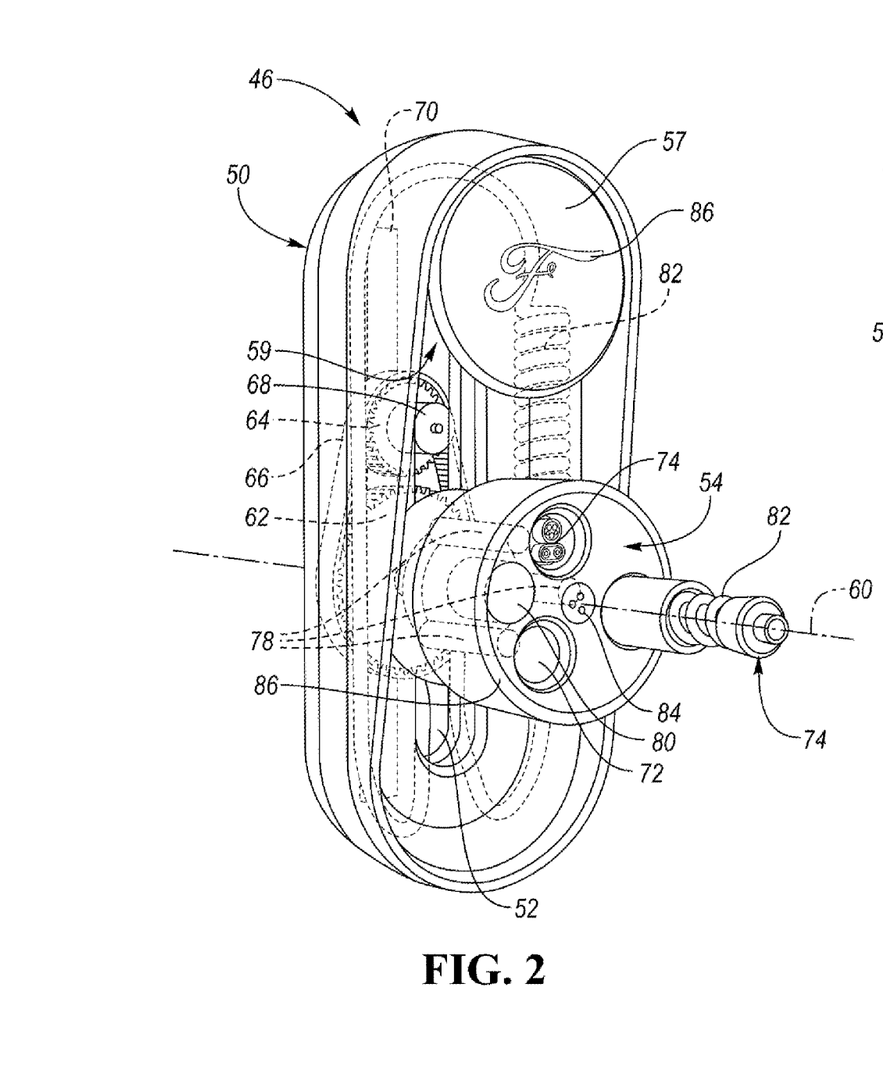
FIG. 2 is an isometric side view of a charging station for the electric vehicle with the charging station in an advanced or engaged position.
Figure 3:
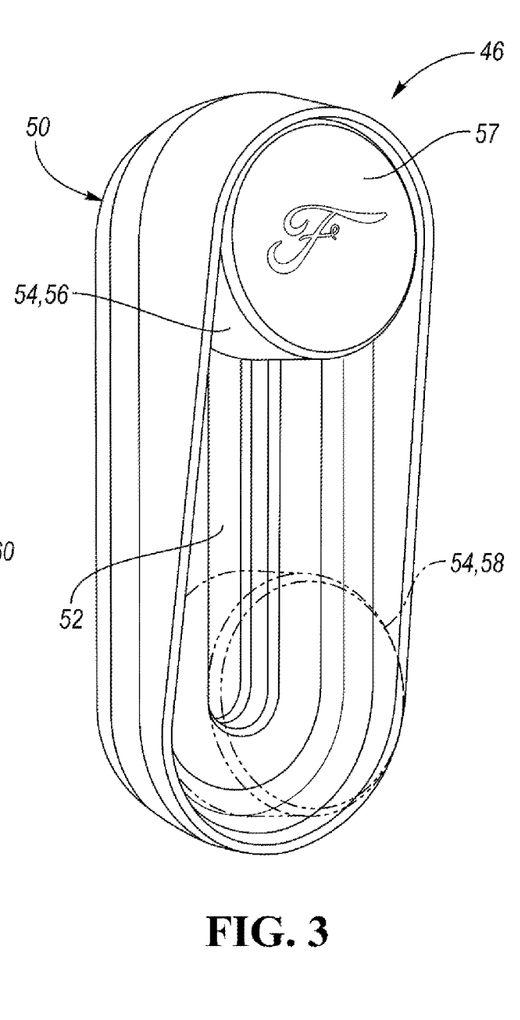
FIG. 3 is an isometric side view of the charging station for the electric vehicle with the charging station in a stowed or retracted position.
Figure 4:
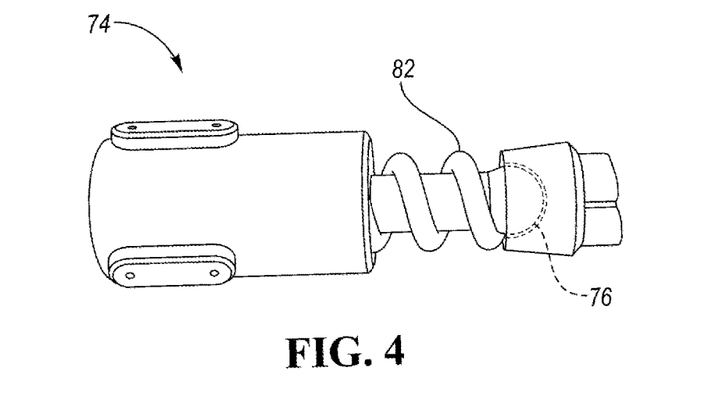
FIG. 4 is a side view of an interchangeable electrical connector of the charging station.
Figure 5:
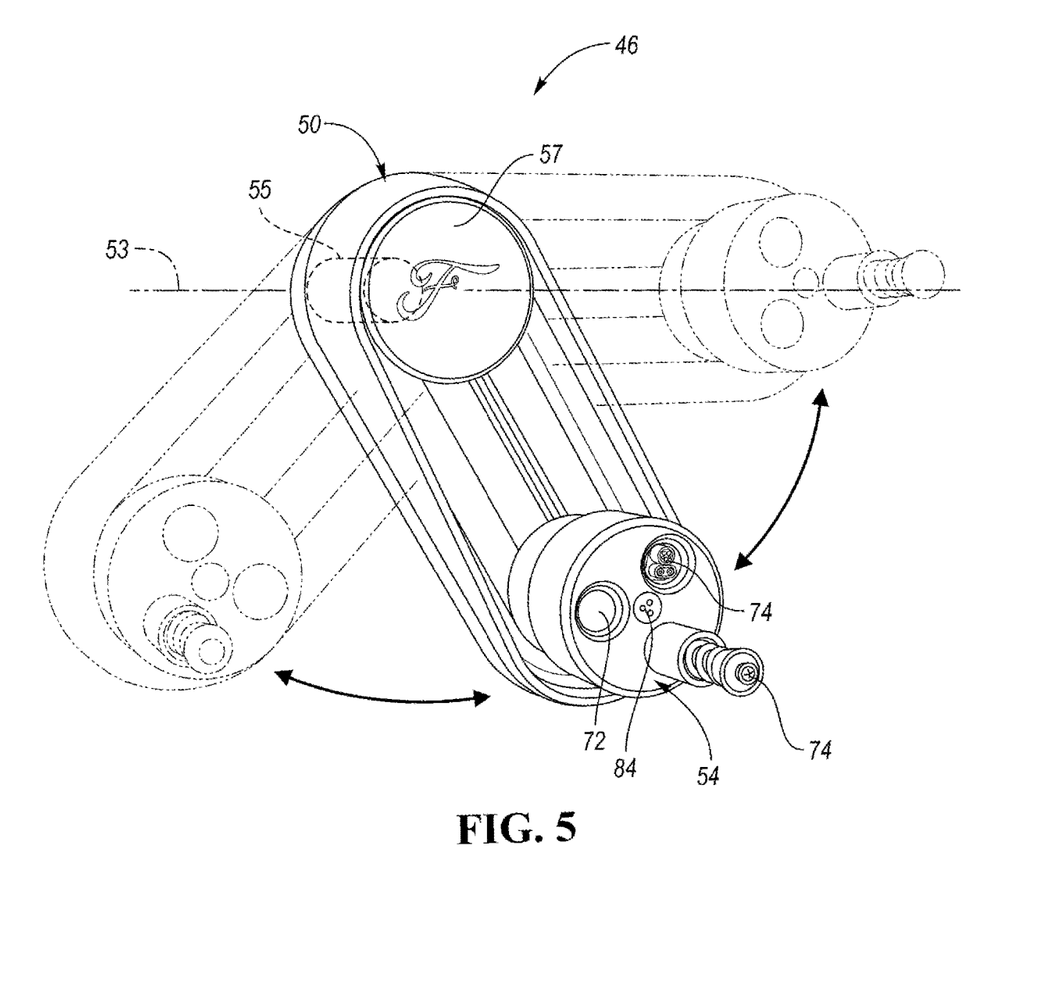
FIG. 5 is an illustration of an additional range of motion of the charging station.
Figure 6:
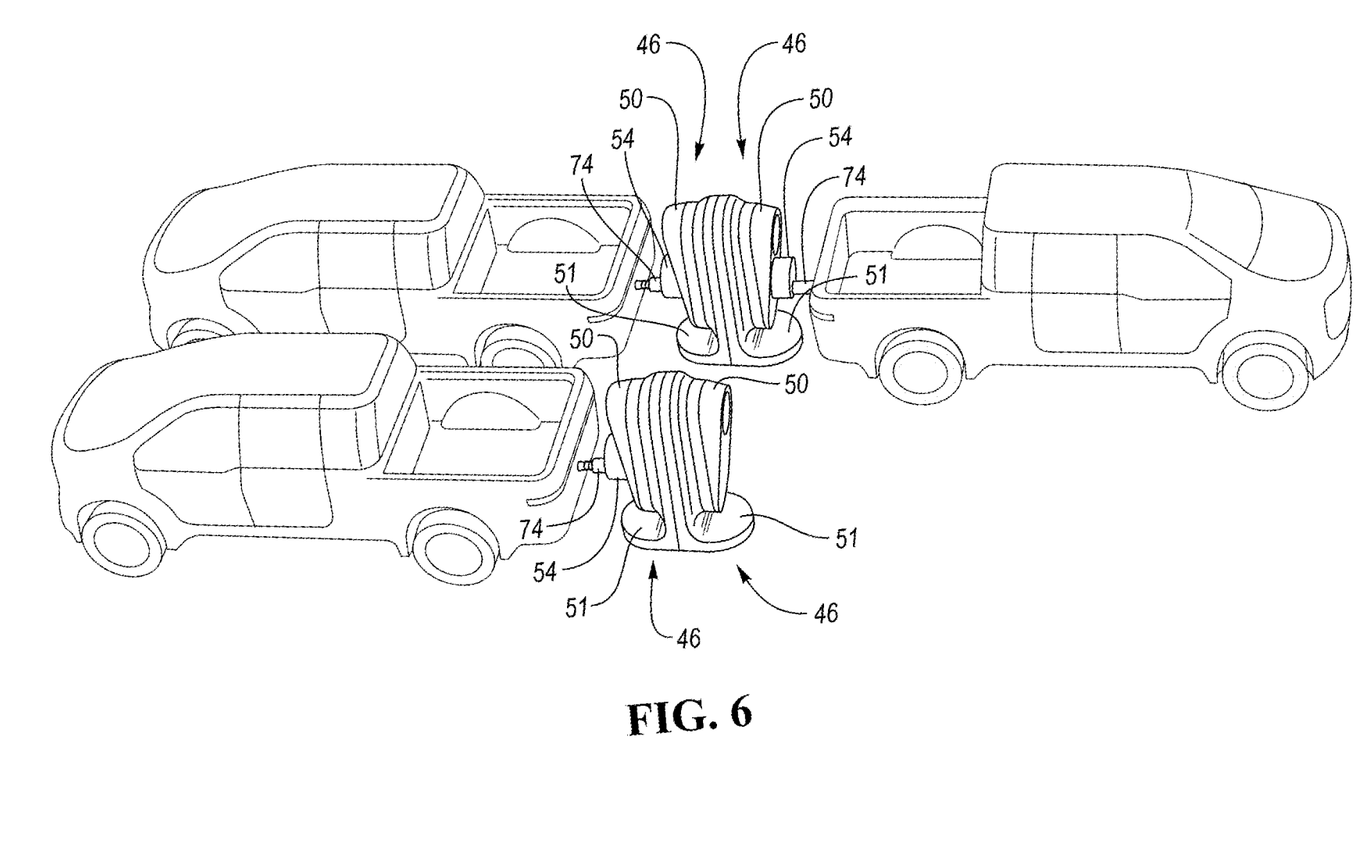
FIG. 6 is an example of a configuration including multiple charging stations.

The first position 56 may be an uppermost position and the second position 58 may be a lowermost position if the track 52 is vertically oriented as illustrated in FIGS. 2 and 3. However, in some embodiments that track 52 may be horizontally oriented or oriented at any angle between horizontal and vertical. The charging head 54 may also be rotatable relative to the housing 50. More specifically, the charging head 54 may be rotatable about axis 60. Axis 60 may extend through a center of the charging head 54 and may be substantially perpendicular to the track 52. Substantially perpendicular may refer to any incremental angle that is between exactly perpendicular and 10° from exactly perpendicular.

The charging head 54 may be connected to a counterbalance 62 that is disposed within the housing 50. The counterbalance 62 is configured to act as a counterweight to balance the cantilevered arrangement of the charging head 54. The counterbalance 62 and the charging head 54 may be connected to a gear 64 and a belt 66. The gear 64 may be connected to an actuator 68, such as an electric motor or servo motor. The actuator 68 is configured to rotate the gear 64, which rotates the belt 66. The belt 66 in turn rotates the counterbalance 62 and charging head 54 in unison. In an alternative embodiment, the counterbalance 62 and charging head 54 may be directly connected to the actuator 68 such that the actuator directly rotates the counterbalance 62 and charging head 54.

The counterbalance 62, charging head 54, and the actuator 68 (which may or may not include the gear 64 and pulley 66) may also be connected to a device 70 so that the position of the counterbalance 62, charging head 54, and the actuator 68 may be adjusted linearly along the track 52. Such a device may include, but is not limited to, a linear bearing and rail combination, a ball screw and ball nut combination, a rack and pinion gearing arrangement, etc. The counterbalance 62, charging head 54, and the actuator 68 may also be connected to a second actuator, such as a cylinder or servo motor, in order to adjust the linear position of the counterbalance 62, charging head 54, and the actuator 68 along device 70.

The charging head 54 may define sockets 72 that are each configured to receive one of a plurality of electrical connectors 74. In FIG. 2, two electrical connectors 74 are secured to the charging head 54. More specifically, the two electrical connectors 74 are disposed within two of the three sockets 72. It should be understood, however, that the electrical connectors 74 may or may not be disposed in any number of the sockets 72 and the that charging head 54 may include any number of sockets 72. The electrical connectors 74 may be interchangeable within each of the sockets 72. The sockets 72, and any electrical connectors 74 that may be disposed therein, may be disposed radially about the charging head 54. Each of the electrical connectors 74 having a different profile and are configured to engage an electrical port of an electric vehicle having a matching profile to charge the battery of the electric vehicle. For Example, a first of the electrical connectors 74 may have a profile required for a SAE J1772 type electrical connection while a second of the electrical connectors 74 may have a profile required for a CCS1 type electrical connection. Since the electrical connectors 74 may be interchangeable within each of the sockets 72, the charging station 46 may be updated with new electrical connectors 74 having matching profiles for newly designed types of electrical connections. Each of the electrical connectors 74 may include a ball joint 76 to compensate for angular positional differences between the electrical connectors 74 and corresponding electrical ports on electric vehicles.

The charging head 54 is configured to advance from the housing (see the position of the charging head 54 illustrated in FIG. 2) and retract to the housing (see the positions of the charging head 54 illustrated in FIG. 3). The electrical connectors 74 are configured to advance from the charging head 54 (see the electrical connector 74 positioned at the right-side of the charging head 54 in FIG. 2) and to retract to the charging head (see the electrical connector 74 positioned at the upper left-side of the charging head 54 in FIG. 2). It is noted that no electrical connector is disposed within the socket 72 positioned at the lower left-side of the charging head 54 in FIG. 2. Actuators 78, such as pneumatic cylinders, hydraulic cylinders, electrical solenoids, servo motors, etc. may be configured to advance and retract the charging head 54 and the electrical connectors 74.

The charging station 46 also includes a controller 80 that has the same or similar characteristics as described above with respect to controller 32. The controller 80 may disposed within the charging head 54. Electrical connections within the charging station 46 and on the electrical connectors 74 may include coiled cables 82 that allow for movement of the electrical connections as the charging head 54 and electrical connectors 74 shift between various positions. Controllers 32 and 80 may communicate with each other during charging or while the vehicle 10 is performing a parking maneuver prior to charging. Such communication may be any form of wireless communication including, but not limited to, radio, Bluetooth, Wi-Fi, etc. Such communication may be directly between the controllers or over a wireless network The controller 80 is programmed to, in response to parking a first vehicle adjacent to the charging station 46 and a first electrical port (e.g., electrical port 42) of the first vehicle having a profile corresponding to the profile of a first of the plurality of electrical connectors 74, adjust the position of the charging head 54 along the track 52 to align the charging head 54 with the first electrical port (if the track 52 is oriented vertically, such an adjustment of the charging head along the track 52 will be an adjustment of the height the charging head 54), rotate the charging head 54 to align the first of the plurality of electrical connectors 74 to the first electrical port, and advance the charging head 54 and the first of the plurality of electrical connectors 74 from the charging head 54 to connect the first of the plurality of electrical connectors 74 to the first electrical port. The position of the charging head 54 may also be adjusted to align the charging head 54 with the first electrical port by rotating the housing 50 about axis 53.

When charging is complete or when the operator desires to drive away from the charging station 46, the controller 80 may be programmed to retract the charging head 54 and the first of the electrical connectors 74 to disengage the first of the plurality of electrical connectors 74 from the first electrical port, and to adjust the position of the charging head 54 along the track 52 to the stowed position (i.e., the first position 56 where the charging head 54 is disposed within the storage space 59). The controller 80 may also be programmed to adjust the position of the charging head 54 along the track 52 to the stowed position in response to the absence of any connection between the charging station 46 and a vehicle.

The controller 80 is further programmed to, in response to parking a second vehicle adjacent to the charging station 46 and a second electrical port of the second vehicle having a profile corresponding to the profile of a second of the plurality of electrical connectors 74, adjust the position of the charging head 54 along the track 52 to align the charging head 54 with the second electrical port (if the track 52 is oriented vertically, such an adjustment of the charging head along the track 52 will be an adjustment of the height the charging head 54), rotate the charging head 54 to align the second of the plurality of electrical connectors 74 to the second electrical port, and advance the charging head 54 and the second of the plurality of electrical connectors 74 from the charging head 54 to connect the second of the plurality of electrical connectors 74 to the second electrical port. The position of the charging head 54 may also be adjusted to align the charging head 54 with the second electrical port by rotating the housing 50 about axis 53.

When charging is complete or when the operator desires to drive away from the charging station 46, the controller 80 may be programmed to retract the charging head 54 and the second of the electrical connectors 74 to disengage the second of the plurality of electrical connectors 74 from the second electrical port, and to adjust the position of the charging head 54 along the track 52 to the stowed position (i.e., the first position 56 where the charging head 54 is disposed within the storage space 59).

The controller 80 may more specifically be programmed to align the correct corresponding electrical connector 74 based on the type of the electrical port of the vehicle that is to being charged. The charging station 46 may include one or more optical sensors 84 that detect the presence of a vehicle, the position of the electrical port on the vehicle, and the type of electrical port on the vehicle. Alternatively, the vehicle controller 32 may communicate the type of electrical port of the vehicle to the charging station 46. The vehicle may include an automated parking sequence that positions the electrical port of the vehicle adjacent to the charging station 46. The vehicle controller 32 may then communicate to the charging station controller 80 whether or not battery charging is desired. If battery charging is desired, the desired electrical connector will be connected based on the alignment sequence described above and based on the type of electrical port on the vehicle that is either detected via the optical sensor 84 or communicated via controller 32.

Once battery charging has commenced one or more light indicators 86 on the exterior of the charging station 46 may be illuminated, which represents the charging state. The light indicators 86 may be any type of light sources, such as one or more light emitting diodes or incandescent bulbs. When the light indicators are not illuminated, no charging is occurring, which may represent that a proper connection between the charging station 46 and a vehicle has not been made or that charging is complete. The light indicators may take the shape of a logo.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A charging station comprising:
   a housing having a track;
   a charging head secured to the track such that the charging head is slidable along the track and rotatable relative to the housing;
   a plurality of electrical connectors disposed radially about the charging head, each of the electrical connectors having a different profile and configured to advance from and retract to the charging head; and
   a controller programmed to, in response to parking a vehicle adjacent to the charging station and an electrical port of the vehicle having a profile corresponding to the profile of a first of the plurality of electrical connectors, (i) adjust a position of the charging head along the track to align the charging head with the electrical port, (ii) rotate the charging head to align the first of the plurality of electrical connectors to the electrical port, and (iii) advance the first of the plurality of electrical connectors from the charging head to connect the first of the plurality of electrical connectors to the electrical port.

2. The charging station of claim 1, wherein the controller is further programmed to, in response to parking a second vehicle adjacent to the charging station and an second electrical port of the second vehicle having a second profile corresponding to the profile of a second of the plurality of electrical connectors, (i) adjust the position of the charging head along the track to align the charging head with the second electrical port, (ii) rotate the charging head to align the second of the plurality of electrical connectors to the second electrical port, and (iii) advance the second of the plurality of electrical connectors from the charging head to connect the second of the plurality of electrical connectors to the second electrical port.

3. The charging station of claim 1, wherein the charging head defines sockets that are each configured to receive one of the plurality of electrical connectors.

4. The charging station of claim 3, wherein each of the plurality of electrical connectors are interchangeable within each of the sockets.

5. The charging station of claim 1 further comprising optical sensors configured to detect presence of the vehicle and a position of the electrical port.

6. The charging station of claim 1, wherein each of the electrical connectors includes a ball joint to compensate for angular positional differences between the electrical connectors and corresponding electrical ports.

7. The charging station of claim 1 further comprising a cover disposed over an end of the track, wherein a storage space is defined between the cover and the end of the track.

8. The charging station of claim 7, wherein the controller is further programmed to, in response to the absence of a connection between the charging station and a vehicle, adjust the position of the charging head along the track such that the charging head is disposed within the storage space.

9. The charging station of claim 1 further comprising a base, wherein the housing is secured to the base.

10. The charging station of claim 9, wherein the housing is rotatably secured to the base, and wherein the controller is further programmed to adjust a position of the housing relative to the base to align the charging head with the electrical port.

11. A charging station comprising:
    a charging head slidable along a track and rotatable along an axis; and
    a plurality of electrical connectors secured to the charging head and disposed radially about the axis, each of the electrical connectors having a different profile and configured to engage an electrical port of an electric vehicle having a matching profile to charge a battery of the electric vehicle, wherein the charging head is configured to slide along the track and rotate along the axis to align each of the electrical connectors with a corresponding electrical port, and wherein each of the electrical connectors is configured to advance from and retract to the charging head to engage and disengage the corresponding electrical port.

12. The charging station of claim 11, wherein the charging head defines sockets that are each configured to receive one of the plurality of electrical connectors.

13. The charging station of claim 12, wherein each of the plurality of electrical connectors are interchangeable within each of the sockets.

14. The charging station of claim 11 further comprising optical sensors configured to detect presence of the vehicle and a position of the electrical port.

15. The charging station of claim 11, wherein each of the electrical connectors includes a ball joint to compensate for an angular positional difference between each of the electrical connectors and the corresponding electrical port.

16. The charging station of claim 11 further comprising a cover disposed over an end of the track, wherein a storage space is defined between the cover and the end of the track.

17. The charging station of claim 16, wherein the charging head is configured to transition to a position where the charging head is disposed within storage space during non-use.

18. The charging station of claim 11 further comprising a base, wherein the track is rotatably secured to the base.

19. A charging station comprising:
- a housing having a vertically extending track;
- a charging head slidable along the track and rotatable along an axis;
- a plurality of electrical connectors disposed radially about the axis; and
- a controller programmed to,
  - adjust a height of the charging head along the track to correspond to a height of an electrical port of a vehicle,
  - rotate the charging head to align a first of the plurality of electrical connectors to the electrical port, and
  - advance the first of the plurality of electrical connectors from the charging head to connect the first of the plurality of electrical connectors to the electrical port.

20. The charging station of claim 19, wherein the controller is further programmed to,
- adjust a height of the charging head along the track to correspond to a height of a second electrical port of the second vehicle,
- rotate the charging head to align a second of the plurality of electrical connectors to the second electrical port, and
- advance the second of the plurality of electrical connectors from the charging head to connect the second of the plurality of electrical connectors to the second electrical port.

* * * * *